(12) United States Patent
Okazaki et al.

(10) Patent No.: US 7,599,600 B2
(45) Date of Patent: Oct. 6, 2009

(54) HARD DISK RECORDER

(75) Inventors: Masaki Okazaki, Daito (JP); Masahiro Matsuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 751 days.

(21) Appl. No.: 11/208,860

(22) Filed: Aug. 23, 2005

(65) Prior Publication Data

US 2006/0045468 A1    Mar. 2, 2006

(30) Foreign Application Priority Data

Aug. 24, 2004   (JP)   ............................. 2004-243805

(51) Int. Cl.
*H04N 5/91*   (2006.01)
(52) U.S. Cl. .......................................... 386/46; 386/83
(58) Field of Classification Search ................... 386/46, 386/83
See application file for complete search history.

(56) References Cited

U.S. PATENT DOCUMENTS

2002/0186423 A1 * 12/2002 Okajima et al. ............. 358/474
2003/0147630 A1 *  8/2003 Kawai et al. ................. 386/83
2003/0231334 A1 * 12/2003 Nagai et al. ................ 358/1.14

FOREIGN PATENT DOCUMENTS

| JP | 2001-268488 | 9/2001 |
| JP | 2003-100027 | 4/2003 |
| JP | 2003-116084 | 4/2003 |
| JP | 2003-230080 | 8/2003 |
| JP | 2003-272358 | 9/2003 |
| WO | WO 01/01415 A1 | 1/2001 |

* cited by examiner

*Primary Examiner*—Asher Khan
(74) *Attorney, Agent, or Firm*—Crowell & Moring LLP

(57) ABSTRACT

The title of a program with a recording duration longest among all recording durations is recorded as the program title of a relevant program file. Thereby, even when a user has performed an operation to record a program on a hard disk recorder by a method other than a timer recording, the program title of a program that is most likely to be a program a user really desires to record can be recorded as the program title of a program file created by the recording. Accordingly, a DTV or a STB can display on its display appropriate program titles in a program file list at the time of playback of a previously recorded program.

4 Claims, 7 Drawing Sheets

HARD DISK RECORDER

BACKGROUND OF THE INVENTION

1. Field of the Invention

The present invention relates to a hard disk recorder.

2. Description of the Related Art

Hard disk recorders (so-called audio/video hard disk drives (AVHDD)) are increasingly used that can be connected to a controller device such as a set-top box (hereinafter referred to as "STB") typified by a digital high definition television tuner, a digital high definition television (hereinafter referred to as "DTV"), or the like via an IEEE 1394 serial bus cable to record and play TV programs in response only to control commands conforming to the IEEE 1394 standard. At the time of playback of a program previously recorded on such an AVHDD, a user generally commands a DTV or a STB to display a list of program files on its display and selects a program file of a desired program from among the program files in the displayed list. The list displayed on the display at the DTV or the STB typically shows, for each recorded program, information such as the date, start time, end time, and duration of the recording, the type of the broadcast signals, the channel, and the title of the program. Among these kinds of information, a user generally places primary importance on the program title for selection of a program file to be played.

However, the conventional AVHDD has the following problem. When a user has performed an operation to record a program on the AVHDD using the DTV and the STB by a method other than a timer recording (when a recording is performed by a method where the AVHDD starts the recording of a program immediately after a user enters the command to start the recording), there is a possibility that a program title shown in the program file list, which is displayed on the display at the DTV or the STB at the time of playback of a prerecorded program, does not match the content of the program file. This is because when a user performs an operation to record a program on the AVHDD by the method other than the timer recording, the AVHDD records the title of a program on the air at the time the recording starts as the program title of a program file created by the recording. In the case where a recording of a program on the AVHDD has been started by the method other than the timer recording, some of DTVs or STBs cause the AVHDD to stop the recording at the time the program ends while some cause the AVHDD to continue the recording until a user enters a command to stop the recording. When the latter is used, the title of a program different from a desired program to be recorded is incorrectly recorded on the AVHDD as the program title of the relevant program file except for the case where a user has entered the command to start the recording while the desired program to be recorded is on the air. For example, when a user has performed an operation to start a recording five minutes before the start of a desired program by the method other than the timer recording, the title of a program preceding the desired program is recorded on the AVHDD as the program title of the program file.

In view of the above problem, Japanese laid-open patent publication 2003-230080 discloses a hard disk recorder that is designed to create a program file associated with a program title for each of programs broadcast sequentially and record the program files and their program titles on the HDD. However, with this technique, when a user enters a command to start a recording while a commercial message just before a desired program to be recorded is broadcast, an unwanted program file containing only the commercial message is created in addition to a program file of the desired program because program information contained in the stream data while the commercial message just before the desired program is being broadcast is still program information concerning a preceding program.

SUMMARY OF THE INVENTION

An object of the present invention is to provide a hard disk recorder such as an AVHDD that can record the program tide of a program most likely to be a program a user really desires to record as the program title of a program file created by a recording even when the user has performed an operation to record the program on the hard disk recorder by a method other than the timer recording, thereby allowing an appropriate program title to be shown in a program file list displayed on a DTV or a STB at the time of playback of a previously recorded program as well as preventing creation of unwanted program files.

According to a first aspect of the present invention, we provide a hard disk recorder comprising: receiving means for receiving stream data and a command to start a recording of the stream data; program file creating means for creating a program file based on the steam data received by the receiving means when the command to start the recording is received by the receiving means; index information editing means for editing index information on the program file that includes a program title of the program file based on program information contained in the stream data received by the receiving means when the command to start the recording is received by the receiving means; a hard disk on which the program file created by the program file creating means and the index information edited by the index information editing means are recorded; output means for outputting a list of the program file created by the program file creating means based on the index information recorded on the hard disk; and recording duration measuring means for detecting a change of program based on a program title contained in the stream data received by the receiving means and measuring a recording duration for each of one or more programs while the program file creating means creates the single program file containing the one or more programs, when a user has performed an operation to record a program on the hard disk recorder by a method other than a timer recording.

The index information editing means records, as the program tide of the program file, a title of a program with a recording duration longest among all the recording durations measured by the recording duration measuring means.

With the above configuration, even when a user has performed an operation to record a program on the hard disk recorder by a method other than the timer recording, the program title of a program with the longest recording duration in the single program file created by the recording, which is most likely to be a program a user really desires to record, can be recorded as the program title of the program file created by the recording. Accordingly, at the time of playback of a previously recorded program, an appropriate program title can be shown in the program file list displayed on a DTV or a STB. Further, unlike the above described technique disclosed in Japanese laid-open patent publication 2003-230080, creation of unwanted program files can be prevented even when a recording is started while a commercial message just before a desired program to be recorded is broadcast.

Preferably, every time there is a change of program title contained in the stream data received from a controller device, a recording duration of a program before the change that is measured by the recording duration measuring means and a program title of the program before the change are recorded on the hard disk; the hard disk recorder further comprises clear means for clearing the recording duration and the program title recorded on the hard disk when the command to start the recording is received by the receiving means; and the index information editing means records, as the program title of the program file, a program title of a program with a recording duration longest among all the recording durations recorded on the hard disk.

Preferably, the hard disk recorder further comprises; storage means for storing a program title and a recording duration of a program longest in recording duration measured by the recording duration measuring means among the programs contained in the single program file; and updating means for updating a program title and a recording duration that are stored in the storage means when a recording duration of a second or subsequent program that is measured by the recording duration measuring means is longer than the recording duration currently stored in the storage means, wherein the index information editing means records, in editing the program title of the program file, a program title stored in the storage means at an end of the recording as the program title of the program file.

The hard disk recorder can be an AVHDD that is a hard disk recorder capable of recording and playing a program in response only to a control command conforming to the IEEE 1394 standard that is sent from the controller device.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Referring now to the accompanying drawings, the preferred embodiments of the present invention are described. In the embodiments described below, the present invention is applied to an AVHDD that is a hard disk recorder capable of recording and playing a program in response only to a control command conforming to the IEEE 1394 standard. It is to be noted that the following description of preferred embodiments of the present invention has been presented for purposes of illustration and description, and is not intended to be exhaustive or to limit the present invention to the precise form disclosed.

Figure 1:
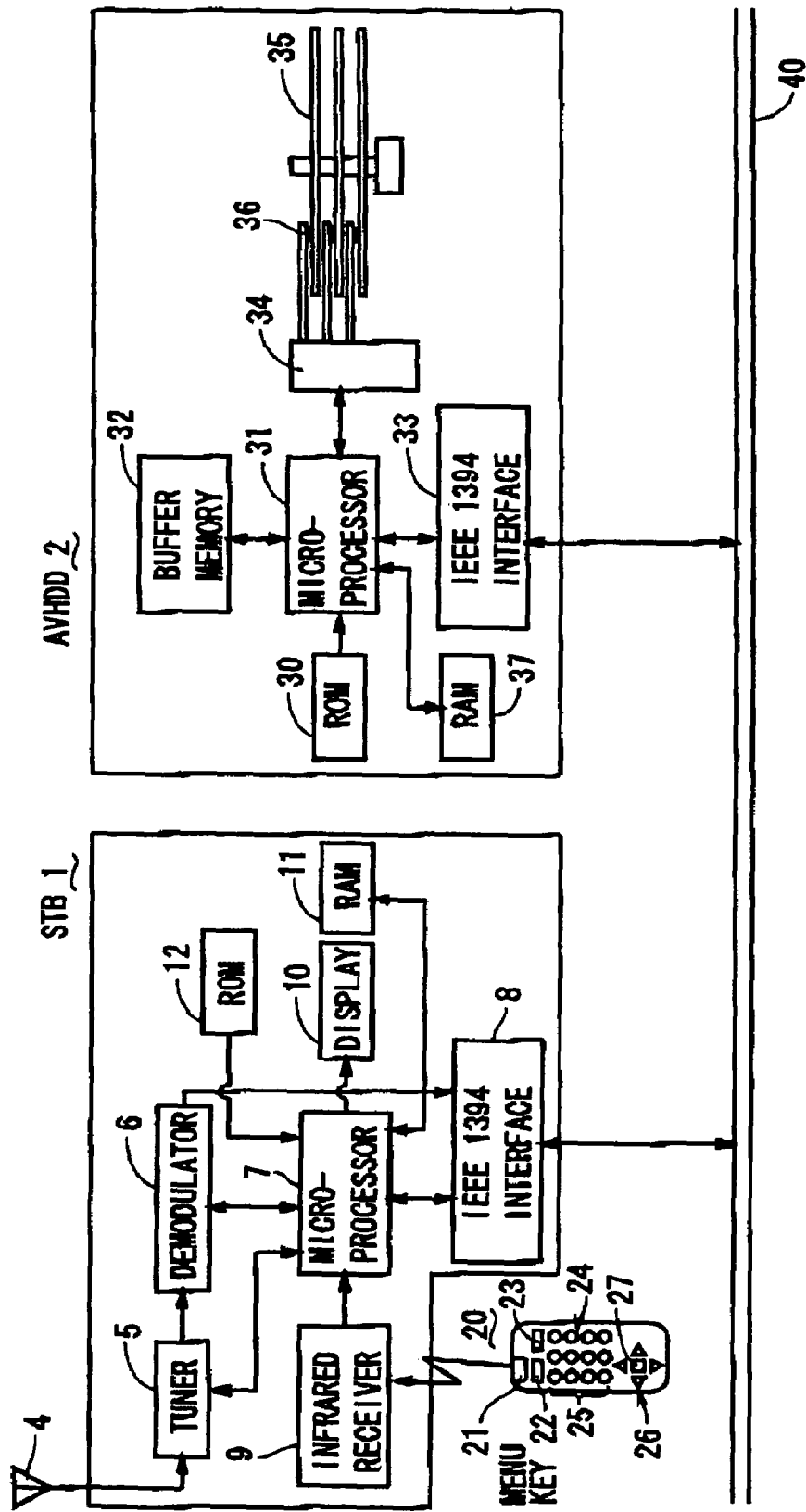
FIG. 1 is an electrical block diagram of an AVHDD that is a hard disk recorder according to a first embodiment of the present invention, and a set-top box.

FIG. 1 shows the electrical configuration of an AVHDD that is a hard disk recorder according to a first embodiment and a set-top box that is a controller device connected to the AVHDD. The first embodiment corresponds to claims 2 and 3 in addition to claims 1 and 6. The set-top box (hereinafter referred to as "STB") 1 comprises a microprocessor 7 that controls each component therein. The microprocessor 7 is connected to a tuner 5, a demodulator 6, an IEEE 1394 interface (hereinafter referred to simply as "interface") 8, an infrared receiver 9, a display 10, a RAM 11, and a ROM 12.

The tuner 5 extracts a broadcast signal on a user-selected channel from broadcast signals received through an antenna 4. The demodulator 6 demodulates the broadcast signal extracted by the tuner 5 in accordance with the broadcasting method. The interface 8 is an interface circuit for sending and receiving data between the STB and other devices on an IEEE 1394 serial bus (hereinafter referred to simply as "bus") 40. The interface 8 sends and receives data to and from the AVHDD 2 via the bus 40. The infrared receiver 9 receives an infrared command signal transmitted from a remote controller 20 and converts the command signal into a standard digital signal for output to the microprocessor 7. The display 10 displays a list of program files stored on the AVHDD 2, various menus, and so on. The RAM 11 temporarily stores data such as a program file list described below. The ROM 12 stores various menus and control programs.

The remote controller 20 has an infrared transmitter 21 and a key portion 24, where arranged are various keys such as a power key 23, numeric keys 25, cursor keys 26, an enter key 27, and a menu key 22 for causing various menus to be displayed. The keys on the remote controller 20 are used, for example, to enter a record command and a play command into the AVHDD 2.

The AVHDD 2 comprises a microprocessor 31 (claimed program file creating means, index information editing means, recording duration measuring means, output means, and clear means) for controlling each component therein, a ROM 30 for storing control programs for the microprocessor 31, a RAM 37 for storing various kinds of data, and an IEEE 1394 interface (hereinafter referred to simply as "interface") 33 for receiving, via the bus 40, data such as a control command and stream data from the STB 1 or other devices. The AVHDD 2 further comprises a plurality of hard disks 35 on which data is recorded, a plurality of magnetic heads 36 for recording and reading data on and from the hard disks 35, a head drive unit 34 for driving the magnetic heads 36, and a buffer memory 32 for temporarily storing data to be recorded or data read. Stored on the hard disks 35 are program file information 43 (see FIGS. 4 and 7), which is index information on each program file, and data such as the recording durations and program titles of one or more programs contained in each program file.

Figure 2:
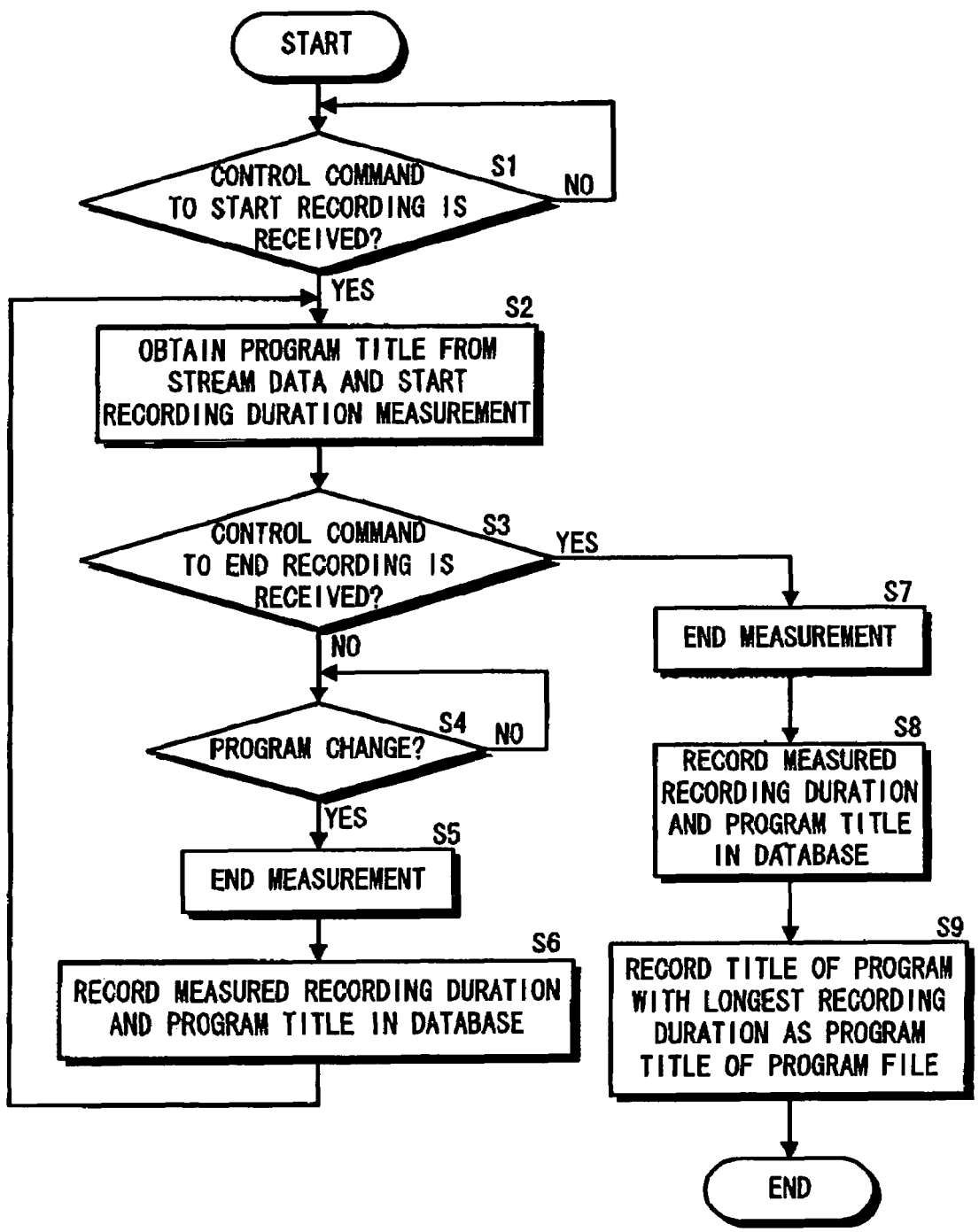
FIG. 2 is a flowchart showing a process executed by the AVHDD to determine the program title of a program file.

Referring now to FIG. 2, how the AVHDD 2 determines the program title of a program file is described. It is to be noted that the following description is made as to the case where a user has performed an operation to record a program on the AVHDD 2 by a method other than the timer recording, i.e., where a recording is performed by a method where the AVHDD 2 starts the recording immediately after a user enters a command to start the recording. The program title determining process starts when a user enters a command to start a recording using the remote controller 20 for the STB 1. Upon receipt of the command, the STB 1 sends a control command to start the recording to the AVHDD 2. Upon receipt of the control command to start the recording from the STB 1 (YES at S1), the microprocessor 31 on the AVHDD 2 side clears the recording duration database 41 on the hard disk 35 shown in FIG. 4. Subsequently, the microprocessor 31 starts receiving stream data from the STB 1 and obtains the program title of a program being received from program information contained in the stream data to store the obtained program title in a workspace within the RAM 37, and at the same time the microprocessor 31 starts a recording duration measurement for the program (S2). When the program title contained in the stream data received from the STB 1 is changed to another one before the microprocessor 31 on the AVHDD 2 side receives a control command to end the recording from the STB 1 (NO at S3), the microprocessor 31 detects a change of received program based on the change of program title (YES at S4) and ends the recording duration measurement (S5). Then, the microprocessor 31 records, in a recording duration database 41 (see FIG. 4) on the hard disk 35, the measured recording duration as well as the title of the program before the change that is stored in the workspace within the RAM 37 at the step S2 (S6). Subsequently, the microprocessor 31 of the AVHDD 2 executes a process similar to the above process of steps S2 to S6 for a program after the change. When YES at the step S3, i.e., when the microprocessor 31 receives a control command to end the recording from the STB 1, the microprocessor 31 ends the recording of the program on the hard disk 35 as well as the recording duration measurement (S7), and then records, in the recording duration database 41 on the hard disk 35, the measured recording duration as well as the program title stored in the workspace within the RAM 37 at the step S2 (S8).

After the recording ends, the microprocessor 31 of the AVHDD 2 records, as the program title of the program file, the program title of a program with a recording duration longest among all the recording durations in records stored in the recording duration database 41 (S9). More particularly, the microprocessor 31 writes the program title of the program with the longest recording duration into a program title area 45 (see FIG. 4) for a relevant record 44 in the program file information 43 stored on the hard disk 35. It is to be noted that, in the program title determining process described above, the microprocessor 31 of the AVHDD 2 temporarily suspends the recording duration measurement for a program upon receipt of a control command to suspend a recording from the STB 1 and resumes the recording duration measurement for the program upon receipt of a control command to resume the recording from the STB 1.

Figure 3:
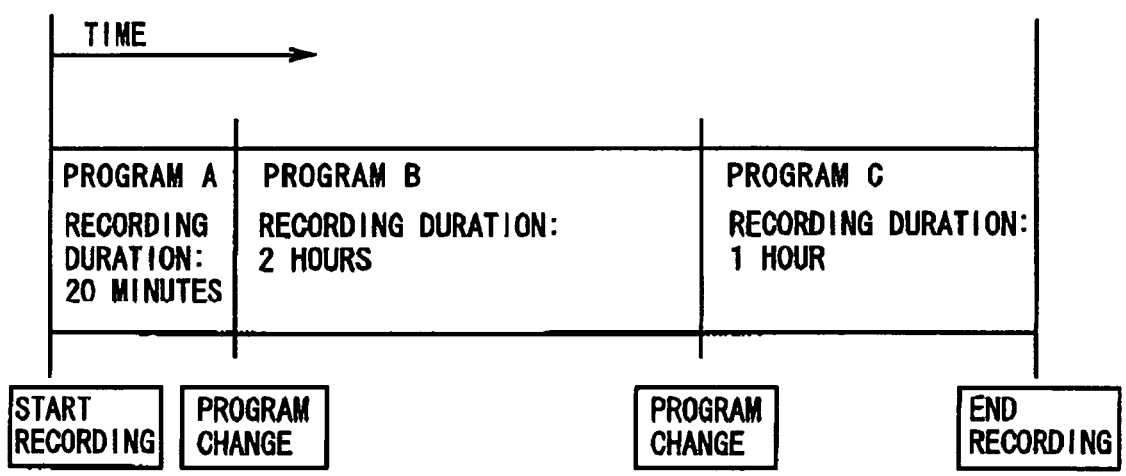
FIG. 3 shows a time table of programs recorded by the AVHDD.
Figure 4:
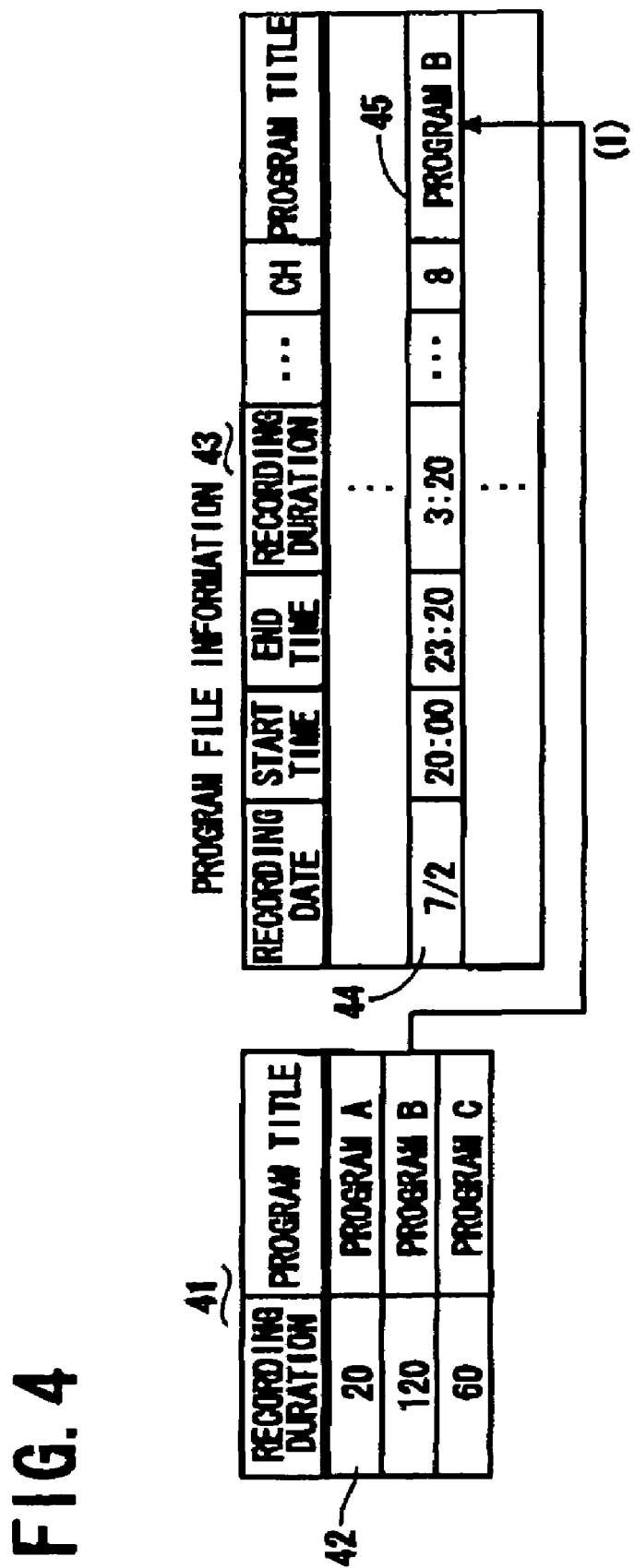
FIG. 4 shows the contents of a recording duration database and program file information that are stored on the hard disk of the AVHDD.

Referring now to FIGS. 3 and 4, an example of the above described program title determining process is described. Assuming that the recording durations of Programs A, B, and C are twenty minutes, two hours, and one hour, respectively, as shown in FIG. 3, three records 42 shown in FIG. 4 are stored in the recording duration database 41 at the end of the recording through the process of the steps S1 to S8 in FIG. 2. As shown in FIG. 4, the recording durations of the respective programs expressed in minutes are stored in recording duration storage areas in the respective records 42. When the process of the step S9 in FIG. 2 is executed in this state, "Program B" that is the program title of a program with a recording duration longest among the recording durations in the respective records 42 within the database 41 are written into the program title area 45 in the record 44 of the relevant program file in the program file information 43 as indicated by an arrow (1) in FIG. 4. Accordingly, when a user operates the remote controller 20 to enter a command to display a list showing program titles and other information about programs stored in the AVHDD 2 in order to view a previously recorded program, the microprocessor 7 on the STB 1 side can display the list of information including the appropriate program title on the display 10 at the STB 1 based on the respective records 44 in the program file information 43 stored on the hard disk 35 of the AVHDD 2.

As described above, when a recording is started by the method other than the timer recording and thereby a single program file containing one or more programs is created, the AVHDD 2 according to the first embodiment records, in the recording duration database 41 on the hard disk 35, the recording duration and program title of a program recorded before a change of program title contained in stream data received from the STB 1 every time there is such a change, and then records the program title of a program with a recording duration longest among all the recording durations recorded on the hard disk 35 as the program title of the program file. Accordingly, even when a recording on the AVHDD 2 is started by the method other than the timer recording, the program title of a program with the longest recording duration in the program file, which is most likely to be a program a user really desires to record, can be recorded as the program title of the program file created by the recording. This can increase the probability that an appropriate program title is shown in the program file list displayed on the STB 1 at the time of playback of a previously recorded program.

Figure 5:
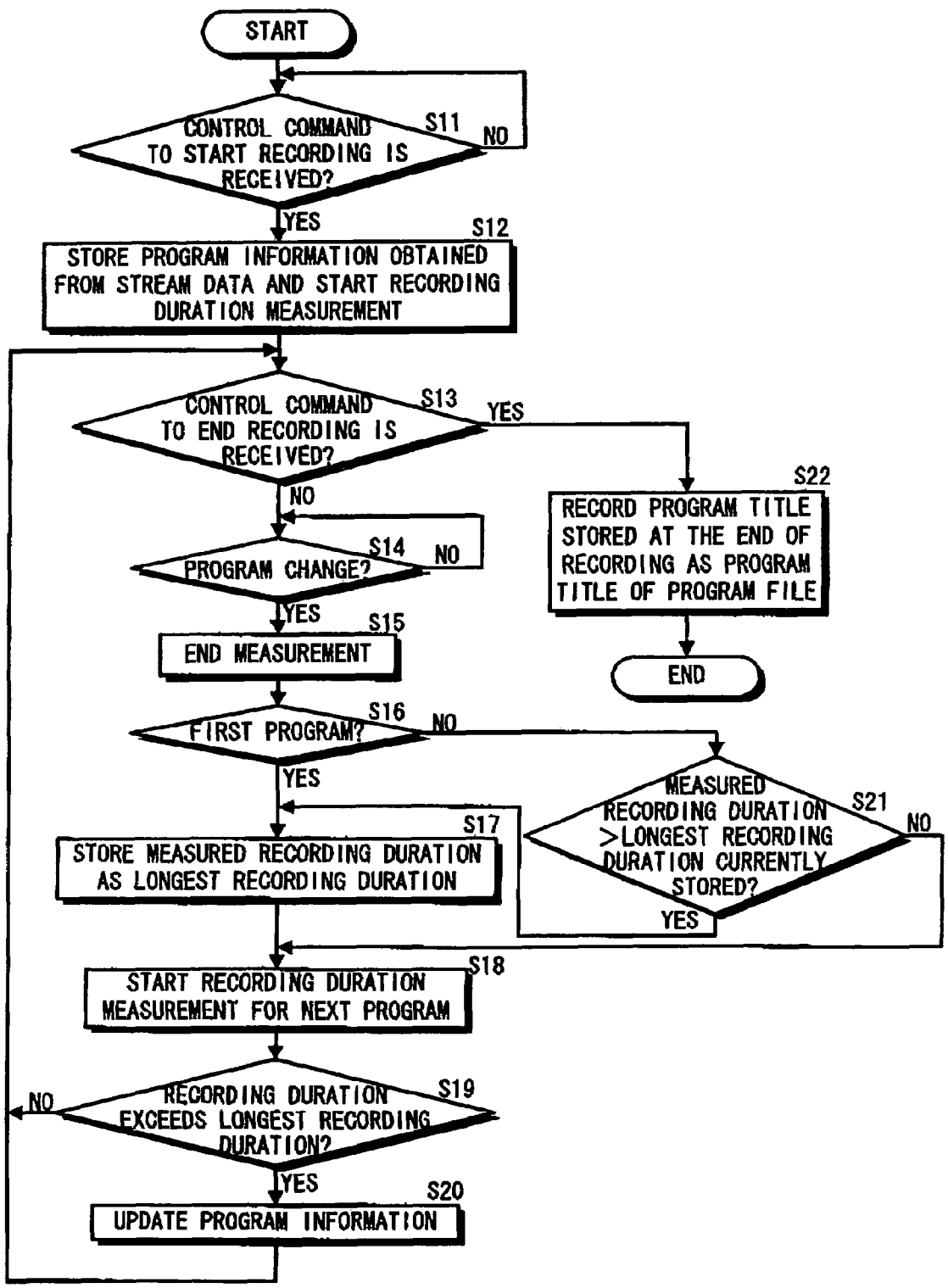
FIG. 5 is a flowchart showing a process executed to determine the program title of a program file by an AVHDD that is a hard disk recorder according to a second embodiment of the present invention.

Referring now to the flowchart of FIG. 5, description is made as to a process of determining the program title of a program file by an AVHDD 2 according to a second embodiment of the present invention. The second embodiment corresponds to claims 4 and 5 in addition to claims 1 and 6. The AVHDD 2 according to the second embodiment and a STB 1 connected thereto are configured similar to the AVHDD 2 according to the first embodiment and the STB 1 that are shown in FIG. 1. In the second embodiment, a RAM 37 and a hard disk 35 serve as storage means in claim 4. Further, a microprocessor 31 on the AVHDD 2 side serves as updating means in claim 4. It is to be noted that the following description is made as to the case where a user has performed an operation to record a program on the AVHDD 2 by a method other than the timer recording based on a program guide or a program code, i.e., where a recording is performed by a method where the AVHDD 2 starts the recording immediately after a user enters a command to start the recording.

First, a process executed by the AVHDD 2 to record the first program is described. When a user enters a command to start a recording using a remote controller 20 for the STB 1, the STB 1 sends a control command to start the recording to the AVHDD 2. Upon receipt of the control command to start the recording from the STB 1 (YES at S11), the microprocessor 31 of the AVHDD 2 starts reception of stream data from the STB 1 and the recording of the first program and stores program information on the first program, which is contained in the stream data, in a program information work 61 (see FIG. 7) on the hard disk 35, and at the same time the microprocessor 31 starts a recording duration measurement for the first program (S12). Subsequently, when the microprocessor 31 of the AVHDD 2 detects a change of program based on program information contained in the stream data received from the STB 1 (YES at S14) before receiving a control command to end the recording from the STB 1 (NO at S13), the microprocessor 31 ends the recording duration measurement for the first program (S15). The program before the change of program is the first program (YES at S16). Thus, the microprocessor 31 stores the recording duration measured for the first program, as a longest recording duration, in a longest recording duration work 63 (see FIG. 8) in the RAM 37 (S17).

Next, a process executed by the AVHDD 2 to record a second or subsequent program is described. When completing the above process for the program before the program change, the microprocessor 31 of the AVHDD 2 starts a recording duration measurement for a program after the change (S18). Subsequently, when the recording duration of the program after the change exceeds the longest recording duration currently stored in the longest recording duration work 63 (see FIG. 8) in the RAM 37 (YES at S19), the microprocessor 31 stores program information on the program contained in the steam data at that time in the program information work 61 (see FIG. 7) on the hard disk 35 (S20). Subsequently, when the microprocessor 31 of the AVHDD 2 detects another change of program based on program information contained in the stream data received from the STB 1 (YES at S14), the microprocessor 31 ends the recording duration measurement for the program before the another change (S15) and determines whether the recording duration measured for the program before the another change is longer than the longest recording duration currently stored in the longest recording duration work 63 (see FIG. 8) in the RAM 37 (S21). When YES at the step 21, the microprocessor 31 records the recording duration of the program before the another change in the longest recording duration work 63, whereby the content of the longest recording duration work 63 is updated (S17). When it is determined at the step S21 that the recording duration of the program before the change is equal to the longest recording duration currently stored in the longest recording duration work 63, the content of the longest recording duration work 63 is not updated because program information on a program broadcast earlier is preferentially used.

After the recording ends, the microprocessor 31 of the AVHDD 2 records the program title contained in the program information stored in the program information work 61 as the program title of the program file. More particularly, when the microprocessor 31 receives a control command to end the recording from the STB 1 (YES at S13), it ends the recording of a program on the hard disk 35 and writes the program title in the program information stored in the program information work 61 into a program title area 45 in the relevant record 44 stored in the program file information 43 (see FIG. 7) on the hard disk 35 (S22).

Figure 6:
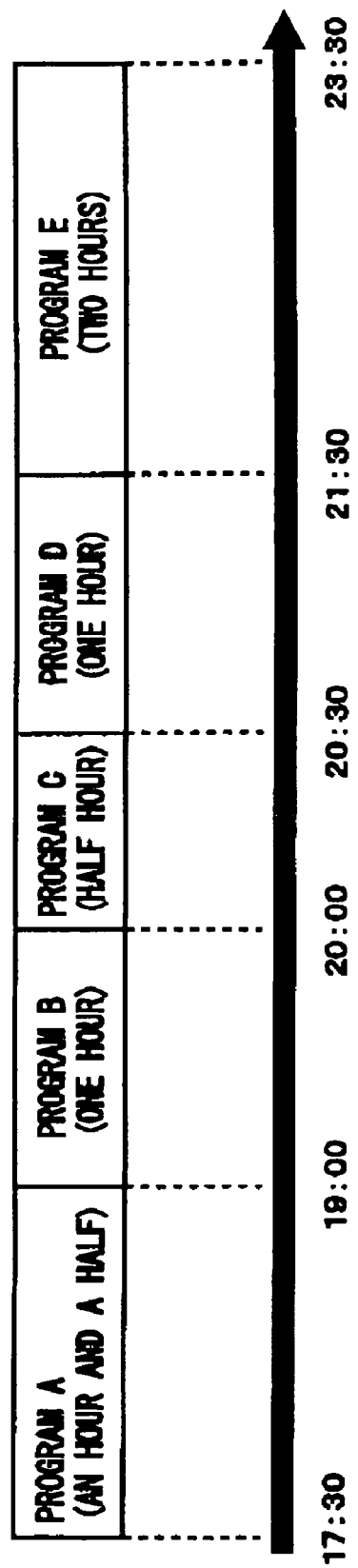
FIG. 6 shows a broadcast time table of programs received by the AVHDD.
Figure 7:
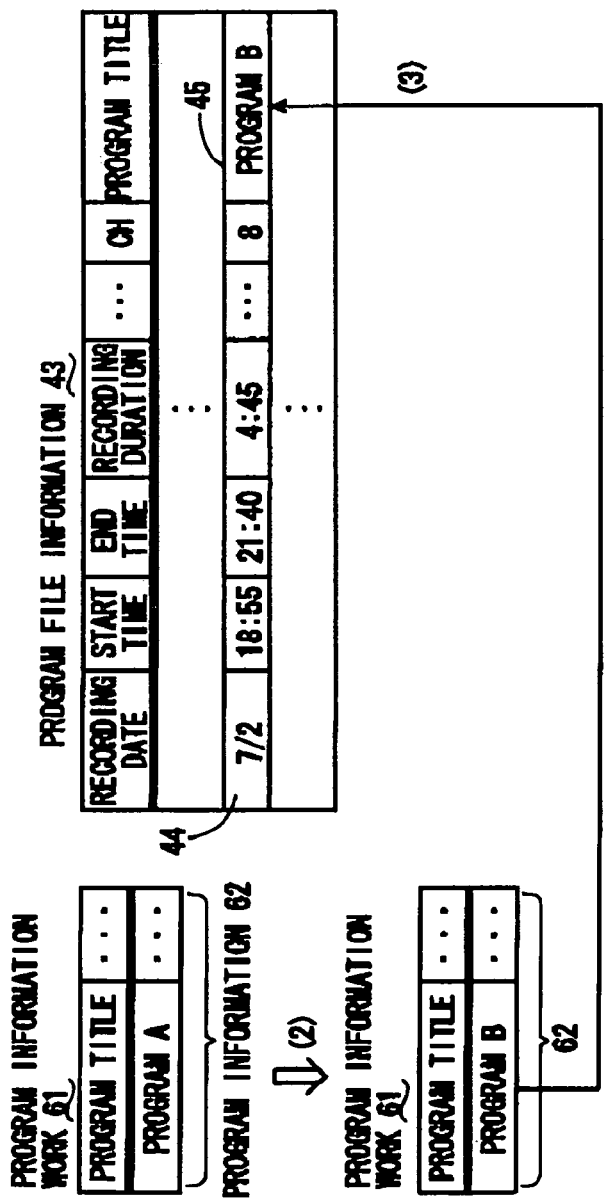
FIG. 7 shows the contents of a program information work and program file information that are stored on the hard disk in the AVHDD.
Figure 8:
FIG. 8 shows the content of a longest recording duration work stored in a RAM in the AVHDD.

Referring now to FIG. 6 to FIG. 8, an example of the above described program tide determining process is described. Assume that the microprocessor 31 of the AVHDD 2 receives a control command to start a recording from the STB 1 at 18:55 to record broadcast stream data as shown in FIG. 6. In this example, the microprocessor 31 first stores, in the program information work 61 shown in FIG. 7, program information 62 on the first program, Program A, contained in the stream data. At 19:00, there is a change of received program. Then, the microprocessor 31 records in the longest recording duration work 63 the recording duration of Program A, five minutes, as the longest recording duration, and starts a recording duration measurement for the program after the change or Program B. After 19:05, i.e., after the recording duration measured for Program B exceeds five minutes that is the recording duration of Program A, the microprocessor 31 stores program information 62 on Program B in the program information work 61 as indicated by an arrow (2) in FIG. 7.

At 20:00, there is the second change of received program. Then, the microprocessor 31 replaces the longest recording duration stored in the longest recording duration work 63 with the recording duration of Program B, sixty minutes (one hour) as indicated by an arrow (4) in FIG. 8, and starts a recording duration measurement for a program after the second change or Program C. When there is the third change of received program at 20:30, the recording duration of Program C (half hour) is shorter than the longest recording duration (sixty minutes) in the longest recording duration work 63. Thus, the microprocessor 31 starts a recording duration measurement for a program after the third change or Program D without updating the contents of the program information work 61 and the longest recording duration work 63. When there is the fourth change of received program at 21:30, the recording duration of Program D (one hour) is equal to the longest recording duration or recording duration of Program B (sixty minutes) that is stored in the longest recording duration work 63. Thus, the microprocessor 31 gives priority to program information on Program B broadcast prior to Program D, i.e., starts a recording duration measurement for a program after the fourth change or Program E without updating the contents of the program information work 61 and the longest recording duration work 63. When the microprocessor 31 of the AVHDD 2 receives a control command to end the recording from the STB 1 at 21:40, the recording duration of Program E (ten minutes) is shorter than the longest recording duration (sixty minutes) stored in the longest recording duration work 63. Thus, the microprocessor 31 ends the recording without updating the contents of the program information work 61 and the longest recording duration work 63.

With the above described process, the program information on Program B is stored in the program information work 61 at the end of the recording. When the recording ends, the microprocessor 31 writes the program title ("Program B") in the program information stored in the program information work 61 into the program title area 45 in the relevant record 44 in the program file information 43 as indicated by an arrow (3) in FIG. 7. Accordingly, when a user operates the remote controller 20 to enter a command to display a list showing program titles and other information about programs stored in the AVHDD 2 for playback of a previously recorded program, the microprocessor 7 on the STB 1 side can display, on the display 10 at the STB 1, the list of information including an appropriate program title based on each record 44 in the program file information 43 stored on the hard disk 35 of the AVHDD 2.

As described above, when a recording is started by the method other than the timer recording based on a program guide or a program code and thereby a single program file containing one or more programs is created, the AVHDD 2 according to the second embodiment stores in the program information work 61 the program title of a program longest in recording duration among the programs contained in the single program file, and records the program title stored in the program information work 61 at the end of the recording as the program title of the program file. Accordingly, even when a recording on the AVHDD 2 is started by the method other than the timer recording, the program title of a program with the longest recording duration, which is most likely to be a program a user really desires to record, can be recorded as the program title of the program file created by the recording. This can increase the probability that an appropriate program title is shown in the program file list displayed on the display 10 at the STB 1 at the time of playback of a previously recorded program.

The present invention has been described above using a presently preferred embodiment, but those skilled in the art will appreciate that various modifications are possible.

Accordingly, all such modifications are intended to be included within the spirit and scope of the present invention. For example, the present invention is applied to the AVHDD in the above embodiments, but it is also applicable to, for example, a typical hard disk recorder having a tuner therein. The controller device connected to the AVHDD via the IEEE 1394 serial bus is not necessarily the STB used in the above embodiments but can be another controller device such as a digital television receiver or the like. Further, the recording duration database 41 described in the first embodiment, and the program information work 61 and the longest recording duration work 63 described in the second embodiment can be either stored in the RAM on the AVHDD side or recorded on the hard disk.

This application is based on Japanese patent application 2004-243805 filed Aug. 24, 2004, the contents of which are hereby incorporated by reference.

What is claimed is:

1. A hard disk recorder comprising:
   receiving means for receiving stream data and a command to start a recording of the stream data;
   program file creating means for creating a program file based on the stream data received by the receiving means when the command to start the recording is received by the receiving means;
   index information editing means for editing index information on the program file that includes a program title of the program file based on program information contained in the stream data received by the receiving means when the command to start the recording is received by the receiving means;
   a hard disk on which the program file created by the program file creating means and the index information edited by the index information editing means are recorded;
   output means for outputting a list of the program file created by the program file creating means based on the index information recorded on the hard disk; and
   recording duration measuring means for detecting a change of program based on a program title contained in the stream data received by the receiving means and measuring a recording duration for each of two or more programs while the program file creating means creates the single program file containing the two or more programs, when a user has performed an operation to record a program on the hard disk recorder by a method other than a timer recording,
   wherein the index information editing means records, as the program title of the program file, a title of a program with a recording duration longest among all the recording durations measured by the recording duration measuring means,
   wherein, every time there is a change of program title contained in the stream data received from a controller device, a recording duration of a program before the change that is measured by the recording duration measuring means and a program title of the program before the change are recorded on the hard disk;
   wherein the hard disk recorder further comprises clear means for clearing the recording duration and the program title recorded on the hard disk when the command to start the recording is received by the receiving means; and
   wherein the index information editing means records, as the program title of the program file, a program title of a program with a recording duration longest among all the recording durations recorded on the hard disk.

2. The hard disk recorder according to claim 1, wherein the hard disk recorder that records and plays a program in response only to a control command conforming to the IEEE 1394 standard that are sent from the controller device.

3. A hard disk recorder comprising:
   receiving means for receiving stream data and a command to start a recording of the stream data;
   program file creating means for creating a program file based on the stream data received by the receiving means when the command to start the recording is received by the receiving means;
   index information editing means for editing index information on the program file that includes a program title of the program file based on program information contained in the stream data received by the receiving means when the command to start the recording is received by the receiving means;
   a hard disk on which the program file created by the program file creating means and the index information edited by the index information editing means are recorded;
   output means for outputting a list of the program file created by the program file creating means based on the index information recorded on the hard disk;
   recording duration measuring means for detecting a change of program based on a program title contained in the stream data received by the receiving means and measuring a recording duration for each of two or more programs while the program file creating means creates the single program file containing the two or more programs, when a user has performed an operation to record a program on the hard disk recorder by a method other than a timer recording,
   wherein the index information editing means records, as the program title of the program file, a title of a program with a recording duration longest among all the recording durations measured by the recording duration measuring means, and
   storage means for storing a program title and a recording duration of a program longest in recording duration measured by the recording duration measuring means among the programs contained in the single program file; and
   updating means for updating a program title and a recording duration that are stored in the storage means when a recording duration of a second or subsequent program that is measured by the recording duration measuring means is longer than the recording duration currently stored in the storage means,
   wherein the index information editing means records, in editing the program title of the program file, a program title stored in the storage means at an end of the recording as the program title of the program file.

4. A hard disk recorder comprising:
   receiving means for receiving stream data and a command to start a recording of the stream data;
   program file creating means for creating a program file based on the stream data received by the receiving means when the command to start the recording is received by the receiving means;
   index information editing means for editing index information on the program file that includes a program title of the program file based on program information contained in the stream data received by the receiving means when the command to start the recording is received by the receiving means;

a hard disk on which the program file created by the program file creating means and the index information edited by the index information editing means are recorded;

output means for outputting a list of the program file created by the program file creating means based on the index information recorded on the hard disk;

recording duration measuring means for detecting a change of program based on a program title contained in the stream data received by the receiving means and measuring a recording duration for each of two or more programs while the program file creating means creates the single program file containing the two or more programs, when a user has performed an operation to record a program on the hard disk recorder by a method other than a timer recording, wherein the index information editing means records, as the program title of the program file, a title of a program with a recording duration longest among all the recording durations measured by the recording duration measuring means, storage means for storing a program title and a recording duration of a program longest in recording duration measured by the recording duration measuring means among the programs contained in the single program file; and updating means for updating a program title and a recording duration that are stored in the storage means when a recording duration of a second or subsequent program that is measured by the recording duration measuring means is longer than the recording duration currently stored in the storage means, wherein the index information editing means records, in editing the program title of the program file, a program title stored in the storage means at an end of the recording as the program title of the program file, and wherein the hard disk recorder that records and plays a program in response only to a control command conforming to the IEEE 1394 standard that are sent from the controller device.

* * * * *